United States Patent
Xu et al.

(10) Patent No.: US 12,427,410 B2
(45) Date of Patent: Sep. 30, 2025

(54) METHOD AND APPARATUS FOR DISPLAYING VIRTUAL SCENE, METHOD AND APPARATUS FOR PROCESSING VIRTUAL SCENE, AND DEVICE

(71) Applicant: Tencent Technology (Shenzhen) Company Limited, Shenzhen (CN)

(72) Inventors: Shili Xu, Shenzhen (CN); Bingwu Zhong, Shenzhen (CN); Yanhui Lu, Shenzhen (CN); Chenlong Ma, Shenzhen (CN); Yabin Fu, Shenzhen (CN); Xiaohu Ma, Shenzhen (CN); Yulin Hu, Shenzhen (CN); Qin Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 361 days.

(21) Appl. No.: 17/991,776

(22) Filed: Nov. 21, 2022

(65) Prior Publication Data

US 2023/0082060 A1 Mar. 16, 2023

Related U.S. Application Data

(63) Continuation of application No. PCT/CN2022/082080, filed on Mar. 21, 2022.

(30) Foreign Application Priority Data

Apr. 26, 2021 (CN) .......................... 202110455848.3

(51) Int. Cl.
*A63F 13/48* (2014.01)
*A63F 13/35* (2014.01)
(Continued)

(52) U.S. Cl.
CPC .............. *A63F 13/52* (2014.09); *A63F 13/35* (2014.09); *A63F 13/48* (2014.09); *A63F 13/5375* (2014.09)

(58) Field of Classification Search
None
See application file for complete search history.

(56) References Cited

U.S. PATENT DOCUMENTS

2012/0142429 A1* 6/2012 Muller .................... A63F 13/69
463/42
2017/0050111 A1* 2/2017 Perry .................... H04L 67/131
(Continued)

FOREIGN PATENT DOCUMENTS

CN 107497116 A 12/2017
CN 109395385 A 3/2019
(Continued)

OTHER PUBLICATIONS

Tencent Technology, ISR, PCT/CN2022/082080, Jun. 21, 2022, 2 pgs.
(Continued)

*Primary Examiner* — Damon J Pierce
(74) *Attorney, Agent, or Firm* — Morgan, Lewis & Bockius LLP

(57) ABSTRACT

A computer device displays at least one virtual scene entrance. The at least one virtual scene entrance corresponds to at least one scene progress of a target virtual scene. The at least one scene progress is determined based on historical interaction behavior of a target object in at least one virtual scene. The computer device transmits a loading request to a first server in response to a trigger operation on a first virtual scene entrance in the at least one virtual scene entrance. The loading request is used for instructing the first server to run the target virtual scene based on a first scene progress corresponding to the first virtual scene entrance. The com-
(Continued)

puter device receives, from the first server, a scene picture of the target virtual scene. The computer device displays the scene picture in response to receiving the scene picture.

20 Claims, 10 Drawing Sheets

(51) Int. Cl.
*A63F 13/52* (2014.01)
*A63F 13/5375* (2014.01)

(56) References Cited

U.S. PATENT DOCUMENTS

2017/0354884 A1\* 12/2017 Benedetto ............. A63F 13/493
2021/0077903 A1  3/2021 Sun

FOREIGN PATENT DOCUMENTS

| CN | 111265860 | A | 6/2020 |
| CN | 111773737 | A | 10/2020 |
| CN | 111917768 | A | 11/2020 |
| CN | 113058264 | A | 7/2021 |
| WO | WO 2014058385 | A1 | 4/2014 |

OTHER PUBLICATIONS

Tencent Technology, WO, PCT/CN2022/082080, Jun. 21, 2022, 4 pgs.
Tencent Technology, IPRP, PCT/CN2022/082080, Oct. 24, 2023, 5 pgs.

\* cited by examiner

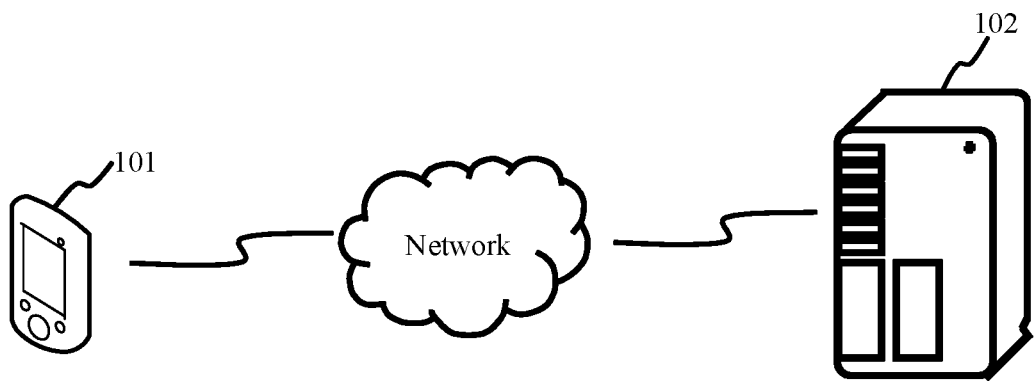

FIG. 1

201 — A terminal displays at least one virtual scene entrance, the virtual scene entrance corresponding to any scene progress of a target virtual scene, the scene progress being determined based on historical interaction behavior of a target object in at least one virtual scene 202 — The terminal transmits a loading request to a first server in response to a trigger operation on a virtual scene entrance, the loading request being used for instructing the first server to run the target virtual scene based on a scene progress corresponding to the virtual scene entrance. The terminal receives from the first server a scene picture of the target virtual scene.

203 — The terminal displays the scene picture in response to receiving the scene picture

FIG. 2

METHOD AND APPARATUS FOR DISPLAYING VIRTUAL SCENE, METHOD AND APPARATUS FOR PROCESSING VIRTUAL SCENE, AND DEVICE

CROSS-REFERENCE TO RELATED APPLICATIONS

This application is a continuation application of PCT Patent Application No. PCT/CN2022/082080, entitled "DISPLAY METHOD OF VIRTUAL SCENE, PROCESSING METHOD OF VIRTUAL SCENE, DEVICE AND EQUIPMENT" filed on Mar. 21, 2022, which claims priority to Chinese Patent Application No. 202110455848.3, filed with the State Intellectual Property Office of the People's Republic of China on Apr. 26, 2021, and entitled "METHOD AND APPARATUS FOR DISPLAYING VIRTUAL SCENE, METHOD AND APPARATUS FOR PROCESSING VIRTUAL SCENE, AND DEVICE", all of which are incorporated herein by reference in their entirety.

FIELD OF THE TECHNOLOGY

This application relates to the field of computer technologies, and in particular, to a method and an apparatus for displaying a virtual scene, a method and an apparatus for processing a virtual scene, and a device.

BACKGROUND OF THE DISCLOSURE

With the vigorous development of the gaming industry, games have become a part of life. Games include different types of virtual scenes such as instances in role-playing games and battle maps in shooting games. Since users experience different game content in different types of virtual scenes, different users prefer virtual scenes that are not exactly the same.

SUMMARY

Embodiments of this application provide a method and an apparatus for displaying a virtual scene, a method and an apparatus for processing a virtual scene, and a device. The technical solutions are as follows.

According to an aspect, a method for displaying a virtual scene is provided. The method includes:

displaying at least one virtual scene entrance, the virtual scene entrance corresponding to at least one scene progress of a target virtual scene, the at least one scene progress determined based on historical interaction behavior of a target object in at least one virtual scene;

transmitting a loading request to a first server in response to a trigger operation on a first virtual scene entrance, the loading request being used for instructing the first server to run the target virtual scene based on a first scene progress corresponding to the first virtual scene entrance, and receiving from the first server a scene picture of the target virtual scene; and displaying the scene picture in response to receiving the scene picture.

According to another aspect, a method for processing a virtual scene is provided, the method including:

providing at least one virtual scene entrance to a terminal, the virtual scene entrance corresponding to at least one scene progress of a target virtual scene, the at least one scene progress determined based on historical interaction behavior of a target object of the terminal in at least one virtual scene;

receiving a loading request of the terminal, the loading request being used for instructing to run the target virtual scene based on a first scene progress, and returning a scene picture of the target virtual scene; and running the target virtual scene based on the scene progress, and transmitting the scene picture of the target virtual scene to the terminal.

According to another aspect, an apparatus for displaying a virtual scene is provided, the apparatus including:

a first display module, configured to display at least one virtual scene entrance, the virtual scene entrance corresponding to any scene progress of a target virtual scene, the scene progress being determined based on historical interaction behavior of a target object in at least one virtual scene;

a request transmission module, configured to: transmit a loading request to a first server in response to a trigger operation on a virtual scene entrance, the loading request being used for instructing the first server to run the target virtual scene based on a scene progress corresponding to the virtual scene entrance, and return a scene picture of the target virtual scene; and a second display module, configured to display the scene picture in response to receiving the scene picture.

According to another aspect, an apparatus for displaying a virtual scene is provided, the apparatus including:

an entrance providing module, configured to provide at least one virtual scene entrance to a terminal, the virtual scene entrance corresponding to any scene progress of a target virtual scene, the scene progress being determined based on historical interaction behavior of a target object of the terminal in at least one virtual scene;

a request receiving module, configured to: receive a loading request of the terminal, the loading request being used for instructing to run the target virtual scene based on a scene progress, and return a scene picture of the target virtual scene; and a running module, configured to: run the target virtual scene based on the scene progress, and transmit the scene picture of the target virtual scene to the terminal.

In some embodiments, the running module is configured to: obtain virtual scene data corresponding to the scene progress with the scene progress as a running start point; and run the target virtual scene based on the virtual scene data.

According to another aspect, a computer device is provided, the computer device including a processor and a memory, the memory being configured to store at least one piece of computer software, the at least one piece of computer software being loaded and executed by the processor to implement the operations performed in the method for displaying a virtual scene in the foregoing aspects or implement the operations performed in the method for processing a virtual scene in the embodiments of this application.

According to another aspect, a non-transitory computer-readable storage medium is provided. The computer-readable storage medium stores at least one piece of computer program, the at least one piece of computer program being loaded and executed by the processor to implement the operations performed in the method for displaying a virtual scene in the foregoing aspects or implement the operations performed in the method for processing a virtual scene in the embodiments of this application.

According to another aspect, a computer program product or a computer program is provided, the computer program product or the computer program including computer program code, the computer program code being stored in a computer-readable storage medium. A processor of a computer device reads the computer program code from the computer-readable storage medium, and executes the computer program code to cause the computer device to implement the operations performed in the method for displaying a virtual scene in the foregoing aspects or cause the computer device to implement the operations performed in the method for processing a virtual scene in the foregoing aspects.

BRIEF DESCRIPTION OF THE DRAWINGS

To describe the technical solutions in the embodiments of this application more clearly, the accompanying drawings required in the description of the embodiments are briefly described below. Apparently, the accompanying drawings in the following description show merely some embodiments of this application, and a person of ordinary skill in the art may still derive other drawings from these accompanying drawings without creative efforts.

FIG. 1 is a schematic diagram of an implementation environment according to an embodiment of this application.

FIG. 2 is a flowchart of a method for displaying a virtual scene according to an embodiment of this application.

DESCRIPTION OF EMBODIMENTS

Figure 3:
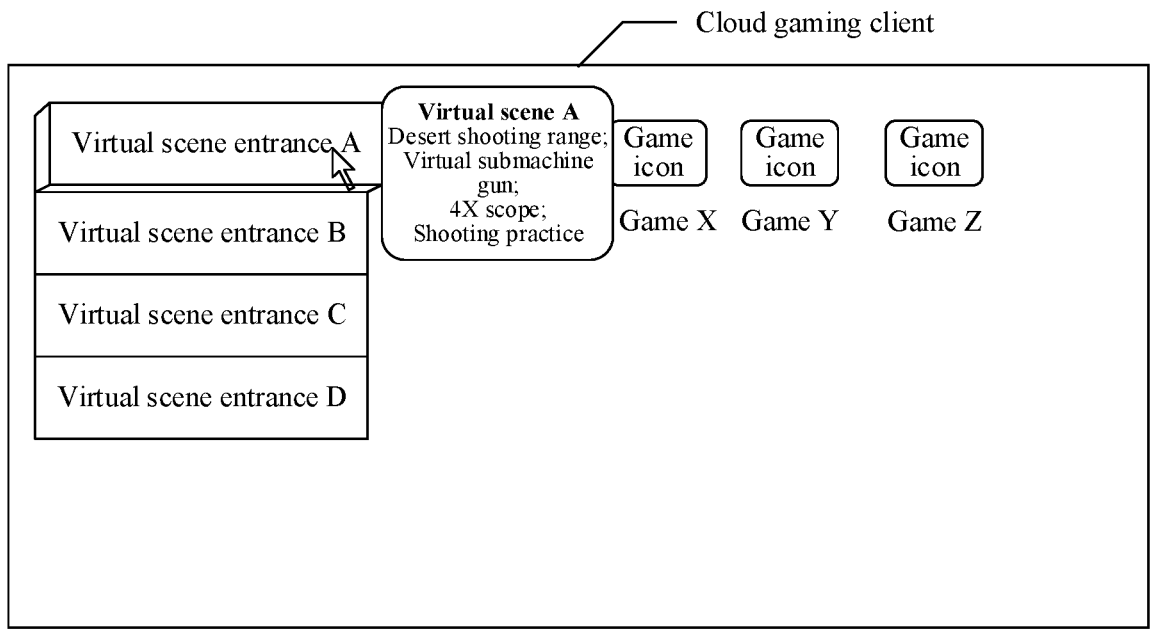
FIG. 3 is a schematic diagram of displaying a virtual scene entrance according to an embodiment of this application.

To make the objectives, technical solutions, and advantages of this application clearer, the following further describes the implementations of this application in detail with reference to the accompanying drawings.

The terms "first", "second", and the like in this application are used for distinguishing between same items or similar items of which effects and functions are basically the same. The "first", "second", and "$n^{th}$" do not have a dependency relationship in logic or time sequence, and a quantity and an execution order thereof are not limited. Although terms such as "first" and "second" are used to describe various elements in the following description, these elements are not to be limited to these terms.

These terms are merely used for distinguishing one element from another element. For example, a first element can be referred to as a second element, and similarly, a second element can be referred to as a first element without departing from the scope of the various examples. Both the first element and the second element may be elements, and in some cases, may be separate and different elements.

"At least one" refers to "one or more". For example, "at least one element" may refer to any integral number of elements, the integral number being greater than or equal to one, for example, one element, two elements, or three elements. "At least two" refers to "two or more". For example, "at least two elements" may refer to any integral number of elements, the integral number being greater than or equal to two, for example, two elements or three elements.

However, in the related art, when a user experiences a preferred virtual scene, complex operations are usually required to reach an expected scene progress to cause a waste of time for the user, resulting in low efficiency of human-computer interaction and affecting user stickiness.

Some technologies used in the embodiments of this application are explained in the following.

A resource allocation solution provided in the embodiments of this application relate to the field of cloud technology.

The cloud technology is a general term of a network technology, an information technology, an integration technology, a management platform technology, an application technology, and the like based on cloud computing commercial mode applications, and may form a resource pool for use on demand, which is flexible and convenient.

Cloud gaming, also referred to as gaming on demand, is an online gaming technology based on cloud computing technology. The cloud gaming technology can implement a high-quality game on a thin client with relatively limited graphics processing and data computing capabilities. In a cloud gaming scenario, a game is run (e.g., executed) on a cloud server instead of a gaming terminal of a player, and the cloud server renders a game scene into a video/audio stream and transmits the video/audio stream to the gaming terminal of the player. The gaming terminal of the player does not need to have strong graphics operation and data processing capabilities, and only needs to have a basic streaming media playback capability and the capability of obtaining an input instruction of the player and transmitting the input instruction to the cloud server.

A virtual scene is displayed (or provided) when an application is run on a terminal. The virtual scene may be a simulated environment of a real world, or may be a semi-simulated semi-fictional virtual scene, or may be an entirely fictional virtual scene. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

Virtual object: a movable object in a virtual scene. The movable object may be a virtual character, a virtual animal, a cartoon character, or the like. For example, in some embodiments, the virtual object is a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

Transparent transmission is transparent pass-through, and refers to the transmission of content to be transmitted from a source address to a destination address regardless of service content to be transmitted in communication, and no change is made to service data content.

A player versus environment (PVE) scene refers to that a user does not require any interaction with another real game player and only needs to be battle other non-player characters (NPCs) and bosses in a game. A training ground in a single-player first-person shooting (FPS) game is the most typical PVE scene.

A multiplayer PVE scene refers to that a user needs to interact and cooperate with other players to battle NPCs and BOSSes in a game together. Multiplayer team training (or a team human-computer battle) in an FPS game is a typical multiplayer PVE scene.

A 1 Versus 1 (1VS1) scene refers to that a user needs to fight 1VS1 battle with another player. A 1VS1 competition in a specific map in an FPS game is a typical 1VS1 scene.

A Player Versus Player scene refers to that a user needs to team up with other players to battle another team of players. Multiplayer team training (or a team human-computer battle) in an FPS game is a typical multiplayer PVP scene.

A mixed scene refers to that there are both PVE and PVP, and it may be necessary to battle a plurality of opponents. However, the mixed scene may be generally obtained by combining virtual scenes of different types.

The implementation environment in this application is described below.

A method for displaying a virtual scene and a method for processing a virtual scene provided in the embodiments of this application can be performed by a computer device. In some embodiments, the computer device is a terminal or a server. The implementation environment provided in the embodiments of this application is first described below by using an example in which the method for displaying a virtual scene is performed by a computer device being a terminal. FIG. 1 is a schematic diagram of an implementation environment according to an embodiment of this application. Referring to FIG. 1, the implementation environment includes a terminal 101 and a server 102.

The terminal 101 and the server 102 can be directly or indirectly connected in a wired or wireless communication manner. This is not limited in this application.

In some embodiments, the terminal 101 is a smartphone, a tablet computer, a notebook computer, a desktop computer, a smart speaker, a smartwatch, or the like, but is not limited thereto. A first client configured to display a virtual scene entrance and a scene picture is installed and run on the terminal 101. The first client may be configured to start any one of an FPS game, a third-person shooter (TPS) game, a multiplayer online battle arena (MOBA) game, a virtual reality application, a 3D map program, and a multiplayer gunfight survival game. Schematically, the terminal 101 is a terminal used by a user. A user account of the user is logged in to in the first client installed and run on the terminal 101. The user uses the terminal 101 to operate a virtual object in a virtual scene by using the first client to perform activities. The activities include, but not limited to, at least one of adjusting body postures, crawling, walking, running, riding, jumping, driving, picking, shooting, attacking, and throwing. For example, the virtual object is a virtual character such as a simulated character role or a cartoon character role.

In the implementation environment, for example, the first client is a cloud gaming client. The cloud gaming client is configured to start at least one game.

For example, the terminal starts the first client to display at least one virtual scene entrance of a target virtual scene. For example, the virtual scene entrance is an entrance of a game instance or a battle map. The game instance and the battle map may belong to the same game or may belong to different games or may partially belong to the same game. A user may trigger any virtual scene entrance. When any virtual scene entrance is triggered, the terminal transmits a loading request to a first server. The first server runs (e.g., executes) the target virtual scene based on a scene progress corresponding to the virtual scene entrance, and returns a scene picture of the target virtual scene. The first server is a cloud gaming server corresponding to the first client. The terminal receives and displays the foregoing scene picture (e.g., image(s) or view(s) of the scene) based on the first terminal. Because the scene picture is obtained through running based on a scene progress, the user may quickly enter an instance in a game based on the cloud gaming client for playing without complex operations, so that the time required for the user to log in to the game, control the virtual object to head for an entrance of an instance, wait for the instance to be loaded, and push progress of the instance to expected progress, thereby improving the efficiency of human-computer interaction.

In some other embodiments, the implementation environment provided in the embodiments of this application is described by using an example in which the method for processing a virtual scene is performed by a computer device being a server 102. In some embodiments, the server 102 is an independent physical server or is a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In the implementation environment, for example, the server 102 is a cloud gaming server. The cloud gaming server is a first server configured to provide a backend service to the cloud gaming client installed and run on the foregoing terminal 101.

For example, the first server provides the foregoing at least one virtual scene entrance to the terminal. Next, after receiving a loading request transmitted by the foregoing terminal based on any virtual scene entrance in the foregoing any virtual scene entrance, the first server runs the target virtual scene based on a scene progress corresponding to the virtual scene entrance, that is, runs a game instance or a battle map. Next, the first server returns a scene picture of the target virtual scene obtained through running to the foregoing first client, and the first client displays the scene picture. A virtual scene entrance is provided to the terminal, so that the first server can run a virtual scene based on a loading request transmitted by the terminal and return the scene picture, to allow the terminal to display the scene picture of the corresponding virtual scene based on a virtual scene entrance selected by the user. Because the scene picture is obtained through running based on the scene progress, the time required for the user to log in to the game, control the virtual object to head for an entrance of an instance, wait for the instance to be loaded, and push a progress of the instance to expected progress, thereby improving the efficiency of human-computer interaction.

A person skilled in the art may learn that there may be more or fewer terminals. For example, there may be only one terminal, or there may be dozens of or hundreds of terminals or more. The quantity and the device type of the terminals are not limited in this embodiment of this application.

FIG. 2 is a flowchart of a method for displaying a virtual scene according to an embodiment of this application. As shown in FIG. 2, an example in which a computer device is a terminal and the terminal performs the method for displaying a virtual scene is used for description in the embodiments of this application. The method for displaying a virtual scene includes the following steps:

Step 201: A terminal displays at least one virtual scene entrance, the virtual scene entrance corresponding to any scene progress of a target virtual scene, the scene progress being determined based on historical interaction behavior of a target object in at least one virtual scene.

In the embodiments of this application, a first client is installed and run (e.g., executed) on the terminal. The first client is a cloud gaming client. The terminal displays at least one virtual scene entrance based on the first client. The at least one virtual scene entrance is provided by a first server corresponding to the first client. The first server is a cloud gaming server and is configured to provide a backend service to the first client. When a number of the at least one virtual scene entrance is greater than one, meaning there are at least two virtual scene entrances, each of the virtual scene entrances can correspond to a respective distinct scene progress of the same virtual scene in the same game in some embodiments. Alternatively, in some embodiments, each of the virtual scene entrances corresponds to a scene progress for a different virtual scene in the same game. Alternatively, the at least one virtual scene entrance corresponds to scene progresses of different virtual scenes in different games. In some embodiments, the target object is a user account that is logged in to on the terminal.

For example, FIG. 3 is a schematic diagram of displaying a virtual scene entrance according to an embodiment of this application. As shown in FIG. 3, the cloud gaming client displays four virtual scene entrances: a virtual scene entrance A, a virtual scene entrance B, a virtual scene entrance C, and a virtual scene entrance D. The four virtual scene entrances correspond to scene progresses of different virtual scenes in different games. In some embodiments, when a user hovers a mouse pointer on any virtual scene entrance, the terminal displays progress information corresponding to the virtual scene entrance. When progress information corresponding to the virtual scene entrance A indicates that the virtual scene entrance corresponds to a virtual scene A, the content of the scene is a desert shooting range, and a virtual character is equipped with a virtual submachine gun and a 4× scope to practice shooting. In some embodiments, in addition to the foregoing four virtual scene entrances, the cloud gaming client may further display a game entrance of another cloud game. The user may trigger the game entrance to play in a conventional gaming mode.

In the embodiments of this application, the scene progress is used for indicating a change degree of the virtual scene.

The target object to which the terminal is logged in can control the first virtual object to perform interaction behavior in the virtual scene to cause a change to the virtual scene to affect the scene progress of the virtual scene, for example, the position of the first virtual object in the virtual scene, the virtual item equipped on the first virtual object, and damage to a building in the virtual scene by the first virtual object. Virtual scenes usually have the same initial progress during running every time, for example, include the same mountains, rivers, and buildings, the same story, and the same NPCs. A process of playing the game by the user is a process of changing the virtual scene.

For example, in an FPS game, the target object intends to be equipped with a virtual submachine gun with a 4× scope in a desert scene to practice shooting at a position 400 meters away from a target. Every time the target object plays the game, the target object needs to control the first virtual object to search for a virtual submachine gun and a 4× scope in the desert scene and move to the position 400 meters away from the target to start practicing. By triggering the virtual scene entrance corresponding to the foregoing scene progress, the terminal can directly display the first virtual object equipped with a virtual submachine gun and a 4× scope and located at the position 400 meters away from the target.

Step 202: The terminal transmits a loading request to a first server in response to a trigger operation on a virtual scene entrance, the loading request being used for instructing the first server to run the target virtual scene based on a scene progress corresponding to the virtual scene entrance. The terminal receives from the first server a scene picture of the target virtual scene.

In the embodiments of this application, the user can trigger any virtual scene entrance (e.g., via a user interaction with the terminal). The terminal determines the triggered virtual scene entrance as the virtual scene entrance, and then transmits a loading request to the first server. In response to receiving the loading request, the first server runs the target virtual scene based on a scene progress corresponding to the virtual scene entrance to obtain a scene picture corresponding to the scene progress. The first server then returns the scene picture to the terminal.

For example, the target virtual scene is a desert scene in an FPS game. The terminal displays a virtual scene entrance corresponding to the desert scene. A scene progress corresponding to the virtual scene entrance is that the first virtual object (that is, a virtual object corresponding to the target object) is equipped with a virtual sniper rifle, a virtual submachine gun, and several virtual grenades, and the first virtual object is located on a hill in the desert scene. The loading request is used for instructing the first server to load the desert scene according to the foregoing scene progress. In other words, the virtual scene entrance of the desert scene corresponds to the remaining part of one round of game instead of a new round of game.

Step 203: The terminal displays the scene picture in response to receiving the scene picture.

In the embodiments of this application, in response to receiving the scene picture returned by the server, the terminal displays the scene picture based on the foregoing first client, to allow the user to view the scene picture based on the first client. In some embodiments, in accordance with detecting a control operation on the virtual object by the target object, the terminal transmits an operation instruction corresponding to the control operation to the first server, the first server updates the scene picture according to the operation instruction, and the terminal receives and displays the updated scene picture based on the first client.

In the solution provided in the embodiments of this application, at least one virtual scene entrance is displayed, so that the user can view and trigger any virtual scene entrance according to preference. Because the virtual scene entrance corresponds to any scene progress of the target virtual scene, the current terminal can request the first server based on the scene progress corresponding to the virtual scene entrance to run the target virtual scene, so that the terminal can display the scene picture of the target virtual scene at the scene progress, and the user can reach the scene progress without complex operations, thereby significantly saving time and improving the efficiency of human-computer interaction and user stickiness.

Figure 4:
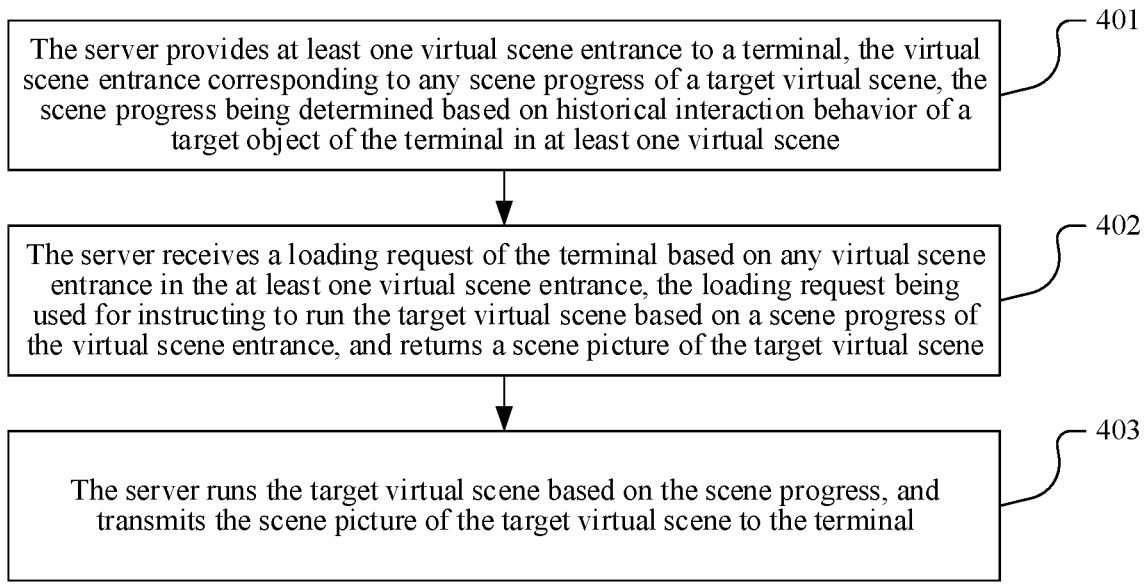
FIG. 4 is a flowchart of a method for processing a virtual scene according to an embodiment of this application.

FIG. 4 is a flowchart of a method for processing a virtual scene according to an embodiment of this application. As shown in FIG. 4, an example in which a computer device is a server and the server performs the method for processing a virtual scene is used for description in the embodiments of this application. The method for processing a virtual scene includes the following steps:

Step 401: The server provides at least one virtual scene entrance to a terminal, the virtual scene entrance corresponding to any scene progress of a target virtual scene, the scene progress being determined based on historical interaction behavior of a target object of the terminal in at least one virtual scene.

In the embodiments of this application, the server is a first server. The first server is a cloud gaming server corresponding to the first client installed and run on the terminal. The first client is a cloud gaming client. In a case of being authorized by a target object of the terminal, the first server can acquire historical interaction behavior of the target object in the at least one virtual scene. The first server determines a scene progress of the at least one virtual scene based on the acquired historical (e.g., past) interaction behavior, and generates at least one virtual scene entrance based on the scene progress. The first server provides the at least one virtual scene entrance to the terminal for display by the terminal. For content related to the scene progress, reference may be made to step 201. Details are not described herein again.

The virtual scene entrance corresponds to the scene progress of the target virtual scene or may be a scene progress corresponding to a professional player in an eSports game. That is, the target object can trigger a scene entrance to enter the remaining part of an eSports game to control a virtual object of any professional player to play.

Step 402: The server receives a loading request of the terminal based on any virtual scene entrance in the at least one virtual scene entrance, the loading request being used for instructing to run the target virtual scene based on a scene progress of the virtual scene entrance, and returns a scene picture of the target virtual scene.

In the embodiments of this application, the loading request is transmitted by the terminal in response to detecting a scene entrance of any virtual scene. In some embodiments, at least one client is run on the first server. One client is configured to run at least one virtual scene. The first server determines, based on the loading request, a second client configured to run the target virtual scene.

Step 403: The server runs the target virtual scene based on the scene progress, and transmits the scene picture of the target virtual scene to the terminal.

In the embodiments of this application, the first server runs the target virtual scene based on the scene progress of the target virtual scene, to make the scene picture of the target virtual scene obtained through running correspond to the scene progress. The first server then returns the scene picture to the terminal to enable the terminal to display the scene picture to a user based on the first client. In some embodiments, the first server may receive an operation instruction transmitted by the terminal, then update the foregoing scene picture according to the received operation instruction based on the second client, and return the updated scene picture to the terminal.

In the method provided in the embodiments of this application, a virtual scene entrance is provided to the terminal, so that the first server can run a virtual scene based on a loading request transmitted by the terminal and return the scene picture, to allow the terminal to display the scene picture of the corresponding virtual scene based on a virtual scene entrance selected by the user. Because the scene picture is obtained through running based on the scene progress, the time required for the user to log in to the game, control the virtual object to head for an entrance of an instance, wait for the instance to be loaded, and push a progress of the instance to expected progress, thereby improving the efficiency of human-computer interaction.

Figure 5:
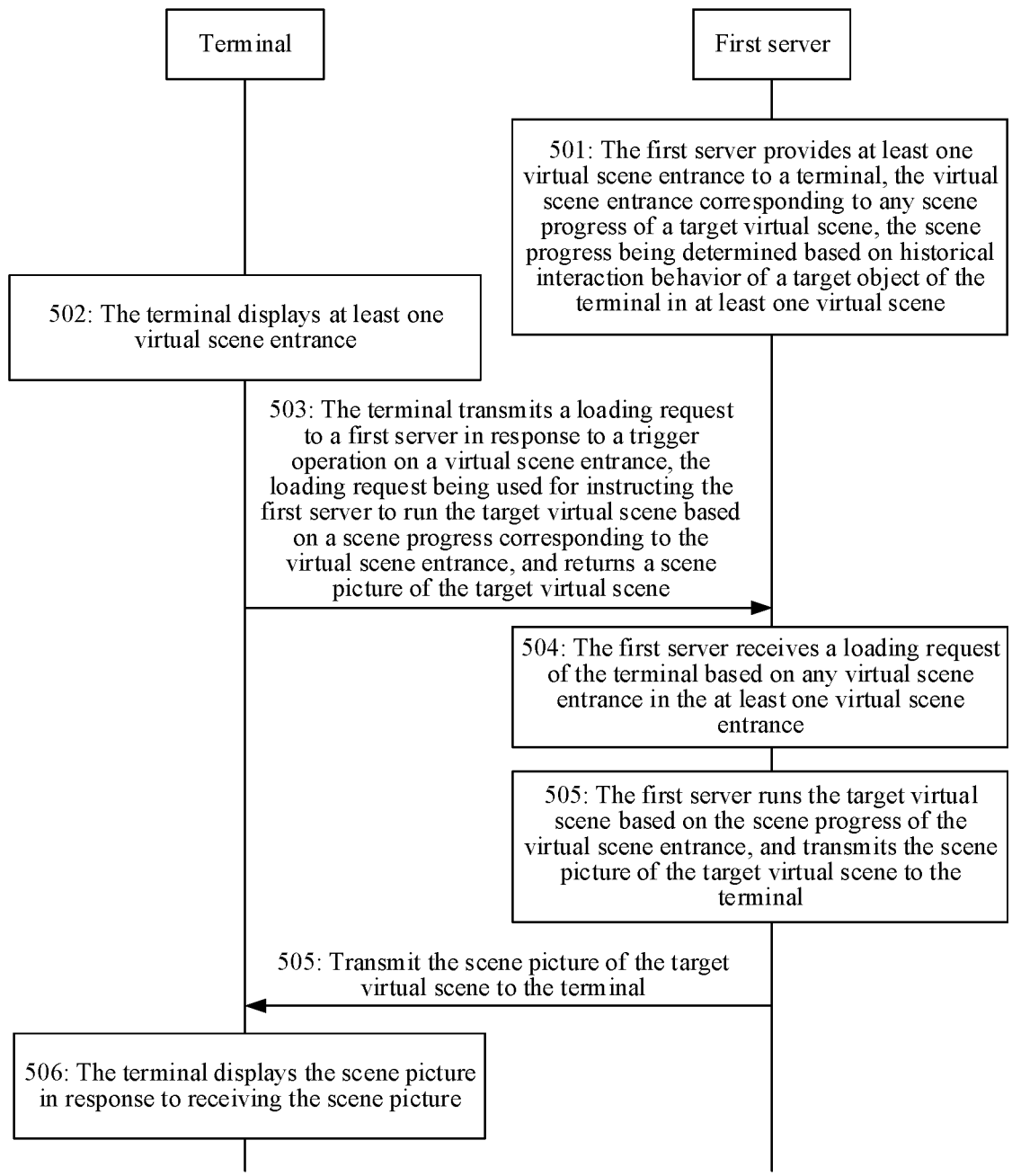
FIG. 5 is a diagram of an interaction procedure according to an embodiment of this application.

FIG. 5 is a diagram of an interaction procedure according to an embodiment of this application. As shown in FIG. 5, the interaction between a terminal and a first server is used as an example for description in the embodiments of this application. The method includes the following steps:

Step 501: The first server provides at least one virtual scene entrance to a terminal, the virtual scene entrance corresponding to any scene progress of a target virtual scene, the scene progress being determined based on historical interaction behavior of a target object of the terminal in at least one virtual scene.

In the embodiments of this application, for this step, reference may be made to step 401. Details are not described herein again.

In some embodiments, the at least one virtual scene entrance is generated by the first server. Correspondingly, the first server obtains the historical interaction behavior of the target object in any virtual scene, and then generates at least one virtual scene entrance of the target virtual scene based on at least one scene progress matching the historical interaction behavior in the target virtual scene. The historical interaction behavior is matched against the scene progress in the target virtual scene, so that a scene progress preferred by the target object can be determined in the target virtual scene based on the historical interaction behavior of the target object.

An FPS game is used as an example. The target object used to perform shooting repeatedly at the same position with the same virtual gun and using the same accessory. In this case, the first server generates a corresponding virtual scene entrance based on the scene progress matching the foregoing behavior in the desert scene. The game can directly start from the scene progress based on the virtual scene entrance.

In some embodiments, the at least one scene progress matching the historical interaction behavior is: at least one scene progress with an occurrence quantity of the historical interaction behavior satisfying a behavior condition. The behavior condition may be that a first quantity threshold is reached.

For example, the first server acquires nearly 20 rounds of game of the target object in the desert scene, and determines, by analyzing gaming data, that in more than three quarters of the rounds, the target object controls the first virtual object to perform shooting at the same position in the desert scene with the same virtual gun and using the same accessory. In this case, the first server determines the scene progress as a scene progress matching the historical interaction behavior.

In some embodiments, the first server determines the foregoing target virtual scene by recognizing a scene picture of the virtual scene displayed on the terminal. Correspondingly, the first server recognizes a scene type of a scene picture of any virtual scene of the terminal, and determines the target virtual scene based on the scene type. The scene type includes, but not limited to, a single-player PVE scene, a multiplayer PVE scene, a 1VS1 scene, a multiplayer PVP scene, and a mixed scene. Optionally, when the target object starts the first client based on the terminal a next time, the first server provides at least one virtual scene entrance corresponding to the target virtual scene to the terminal.

For example, the scene picture of the virtual scene displayed on the terminal is a training ground in an FPS game. After recognizing the scene picture displayed on the terminal, the first server determines that the scene type is a single-player PVE scene, and then determines the single-player PVE scene as the target virtual scene.

In some embodiments, the first server determines a target scene type based on an appearance quantity of the scene type, the target scene type being a scene type with an appearance quantity satisfying an appearance condition; and the first server determines any virtual scene belonging to the target scene type as the target virtual scene. The appearance condition is that a second quantity threshold is reached. Optionally, when the target object controls the first virtual object to frequently enter a virtual scene of the same scene type, the first server provides at least one virtual scene entrance of a target virtual scene belonging to the same scene type as the virtual scene to the terminal.

In some embodiments, the first server can further obtain running information of a plurality of virtual scenes run on the terminal. The running information is used for indicating historical interaction behavior of the target object in the virtual scenes. Next, the first server analyzes the preference of the target object according to the running information to obtain preference information of the target object for the plurality of virtual scenes. The preference information is used for indicating preference degrees of the target object for the virtual scenes and different scene progresses of the virtual scenes. The historical interaction behavior of the target object in the virtual scenes are acquired, so that preference degrees of a user for the virtual scenes and the scene progresses of the scenes can be determined, and a virtual scene entrance can be recommended to the user based on the preference degrees.

For example, the target object enters a virtual scene. A cloud gaming server obtains and records interaction behavior of the first virtual object controlled by the target object in the virtual scene, for example, an explored area, an equipped virtual item, and a scene position of a long stay. The cloud gaming server determines a preference degree of the target object for the virtual scene according to gaming data.

In some embodiments, the first server can directly obtain the preference degrees of the target object for the virtual scenes and different scene progresses of the virtual scenes from a second server. The second server is a gaming server corresponding to a second client. The second client is a gaming client corresponding to a virtual scene.

For example, the gaming client transmits gaming data of the target object to the gaming server. The gaming server extracts interaction behavior of the target object from the gaming data, then determines a preference degree of the target object for the virtual scene, and feeds back the preference degree to the gaming client. The gaming client then transmits the preference degree to the first server.

In some embodiments, the first server generates at least one virtual scene entrance based on the preference information of the target object for the virtual scenes. Correspondingly, the first server determines, according to the preference information, at least one target virtual scene, that is, a virtual scene in which the user is interested. Next, for any target virtual scene, the first server obtains a plurality of scene segmentation points corresponding to the target virtual scene. Next, the first server selects at least one scene segmentation point from the plurality of scene segmentation points according to historical interaction behavior of the target object in the target virtual scene. The first server segments the target virtual scene based on the at least one scene segmentation point to obtain at least one virtual scene entrance. Different virtual scene entrances correspond to different scene progresses of the target virtual scene. For any scene segmentation point of the target virtual scene, the first server obtains scene data corresponding to the target virtual scene at the scene segmentation point, that is, data of the target virtual scene. The target data is used for loading scene content during the running of the target virtual scene. In some embodiments, the first server obtains scene status data corresponding to the target virtual scene at the scene segmentation point. The scene status data represents status data corresponding to the first virtual object corresponding to the target object at the scene segmentation point of the target virtual scene and is used for loading the first virtual object in the target virtual scene. In some embodiments, the scene status data is instantaneous status data of the first virtual object obtained at the scene segmentation point when the first virtual object corresponding to the first server at the target object enters the target virtual scene any time; or the scene status data is average status data of the first virtual object at the scene segmentation point obtained when the first virtual object corresponding to the first server at the target object enters the target virtual scene a plurality of times.

For example, the target virtual scene is a training ground in an FPS game. The first server obtains two scene segmentation points of the training ground. The first scene segmentation point is a moment at which the first virtual object uses a virtual submachine gun to aim at a target with a 4× scope. The second scene segmentation point is a moment at which the first virtual object uses a virtual sniper rifle to aim at a target with an 8× scope. The first server segments the training ground according to the historical interaction behavior of the target object in the training ground, that is, the behavior of repeatedly using the virtual submachine gun and the virtual sniper rifle, to obtain two virtual scene entrances. A scene progress of the training ground corresponding to one virtual scene entrance is that the first virtual object corresponding to the target object is equipped with a virtual submachine gun, uses a 4× scope, and is at a position 400 meters away from a target. A scene progress of the training ground corresponding to the other virtual scene entrance is that the first virtual object corresponding to the target object is equipped with a virtual sniper rifle, uses an 8× scope, and is at a position 1500 meters away from a target.

In some embodiments, the virtual scene may include a plurality of sub-scenes, for example, sub-instances in an instance. The first server can segment, according to historical interaction behavior of the target object in an instance, a sub-instance in which the target object is interested, to allow the target object to directly enter the sub-instance. Correspondingly, for any virtual scene including a sub-instance, the first server determines, according to the historical interaction behavior of the target object in the virtual scene, at least one target sub-scene preferred by the target object. For any target sub-scene, the first server generates a virtual scene entrance corresponding to the target sub-scene.

For example, the virtual scene is a scene including eight rooms. Each room corresponds to one sub-scene. The virtual object needs to pass through the eight rooms in sequence. The first server determines, according to historical interaction behavior of the target object in the eight rooms, three rooms in which a user is interested to generate virtual scene entrances corresponding to the three rooms, to allow the user to directly enter any room in the three rooms without passing through the room in sequence.

In some embodiments, the target object can share the scene progress of the virtual scene with other objects, that is, share the scene progress of the virtual scene with other user accounts. Correspondingly, the terminal displays a scene picture of any virtual scene, and the terminal displays guidance information of the virtual scene in the scene picture of the virtual scene, the guidance information being used for prompting whether to share a scene progress of the virtual scene. In some embodiments, when the target object enters the virtual scene for the first time, the terminal displays guidance information, or otherwise, the terminal does not display the guidance information again. The guidance information is displayed to allow the user to choose a game progress that the user habitually uses with other users, to enhance the exchange between users, so that the user is more willing to play the game, thereby improving user stickiness.

In some embodiments, the target object can directly log in to a gaming client, and a gaming server corresponding to the gaming client generates the foregoing at least one virtual scene entrance. Alternatively, the target object logs in to a cloud gaming client and interacts with the cloud gaming client through a cloud gaming server. In this case, the cloud gaming client and the cloud gaming server perform transparent data transmission.

Figure 6:
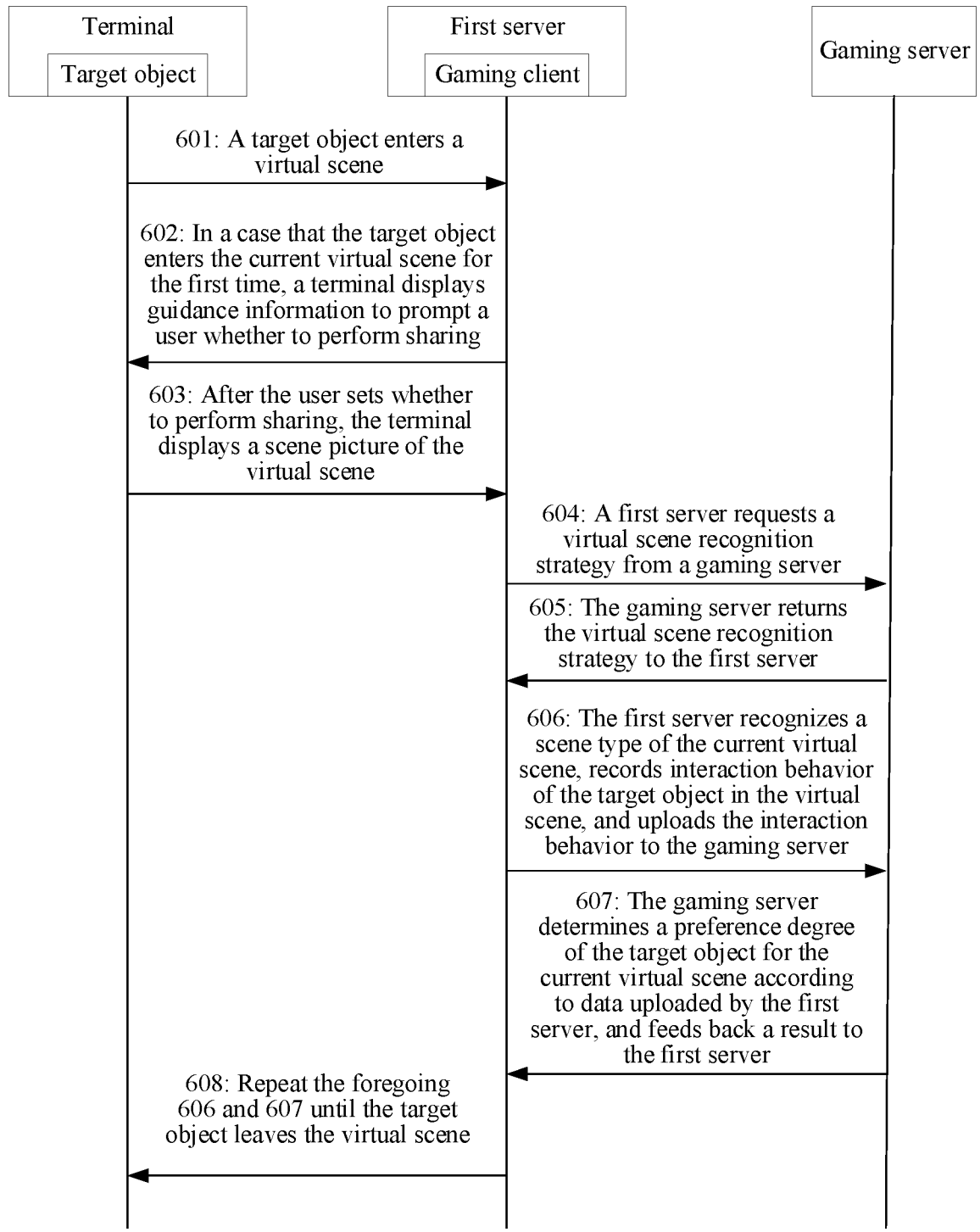
FIG. 6 is a schematic flowchart of generating a virtual scene entrance according to an embodiment of this application.

To make the procedure of generating at least one virtual scene entrance in the foregoing embodiments more comprehensible, FIG. 6 is a schematic flowchart of generating a virtual scene entrance according to an embodiment of this application. As shown in FIG. 6, the procedure includes the following steps: 601: A target object enters a virtual scene. 602: When the target object enters the current virtual scene for the first time, a terminal displays guidance information to prompt a user whether to perform sharing. 603: After the user sets whether to perform sharing, the terminal displays a scene picture of the virtual scene. 604: A first server requests a virtual scene recognition strategy from a gaming server. 605: The gaming server returns the virtual scene recognition strategy to the first server. 606: The first server recognizes a scene type of the current virtual scene, records interaction behavior of the target object in the virtual scene, and uploads the interaction behavior to the gaming server. 607: The gaming server determines a preference degree of the target object for the current virtual scene according to data uploaded by the first server, and feeds back a result to the first server. 608: Repeat the foregoing 606 and 607 until the target object leaves the virtual scene.

Step 502: The terminal displays at least one virtual scene entrance.

In the embodiments of this application, for this step, reference may be made to 201. Details are not described herein again.

In some embodiments, the terminal displays the at least one virtual scene entrance in a list based on the first client. The at least one virtual scene entrance is a text link in the list.

In some embodiments, the terminal displays at least one virtual scene entrance in the form of a picture link based on the first client. In some embodiments, the picture link displays introduction information of virtual scenes corresponding to the virtual scene entrances. The introduction information includes information such as a name, a scene progress, and a virtual character status of a virtual scene.

Step 503: The terminal transmits a loading request to a first server in response to a trigger operation on a virtual scene entrance, the loading request being used for instructing the first server to run the target virtual scene based on a scene progress corresponding to the virtual scene entrance, and returns a scene picture of the target virtual scene.

In the embodiments of this application, for this step, reference may be made to step 202. Details are not described herein again.

In some embodiments, at least one of a teammate or an opponent needs to be matched before the target virtual scene can be run. The loading request further carries matching information, the matching information being used for indicating a matching mode with a second virtual object in the target virtual scene, the second virtual object being any of the following: a virtual object belonging to the same camp as the first virtual object, a virtual object belonging to an adversarial camp of the first virtual object, and a neutral virtual object. The first virtual object is a virtual object corresponding to the target object. Correspondingly, before transmitting the loading request to the first server, the terminal displays a matching information setting page, the matching information setting page being used for setting a matching mode of the second virtual object. Next, the terminal generates the matching information according to the matching mode set on the matching information setting page. A form of setting a matching mode may be a check box, a radio button, a pull-down menu, or the like. This is not limited in the embodiments of this application.

For example, the terminal displays a matching information setting page based on the cloud gaming client. The matching information setting page displays a check box corresponding to teammate matching and a check box corresponding to opponent matching. When the user only checks the check box corresponding to teammate matching, the terminal detects, on the matching information setting page based on the first client, that the set matching mode is teammate matching only. When the user only checks the check box corresponding to opponent matching, the terminal detects, on the matching information setting page based on the first client, that the set matching mode is opponent matching only. When the user checks both the check box corresponding to teammate matching and the check box corresponding to opponent matching, the terminal detects, on the matching information setting page based on the first client, that the set matching mode is both teammate matching and opponent matching. Certainly, when the user checks neither the check box corresponding to teammate matching nor the check box corresponding to opponent matching, the terminal displays matching prompt information based on the first client. The matching prompt information is used for prompting the user to make a selection.

Step 504: The first server receives a loading request of the terminal based on any virtual scene entrance in the at least one virtual scene entrance.

In the embodiments of this application, for this step, reference may be made to step 402. Details are not described herein again.

In some embodiments, the first server can run in advance a target virtual scene corresponding to at least one virtual scene entrance provided to the terminal, so that after receiving the loading request, the first server can directly return a scene picture of the target virtual scene to the terminal, to reduce the time for the user to wait for the first server to start the target virtual scene, thereby improving the efficiency of human-computer interaction.

Step 505: The first server runs the target virtual scene based on the scene progress of the virtual scene entrance, and transmits the scene picture of the target virtual scene to the terminal.

In the embodiments of this application, for this step, reference may be made to step 403. Details are not described herein again.

In some embodiments, the first server obtains virtual scene data corresponding to the scene progress with the scene progress as a running start point, and then runs the target virtual scene based on the virtual scene data. The virtual scene data corresponding to the scene progress only involves a change such as a building, a vehicle, an NPC, and story in the virtual scene.

In some embodiments, the first server obtains virtual scene data corresponding to the scene progress with the scene progress as a running start point, then obtains a historical scene state of the target object, and then runs the target virtual scene based on the virtual scene data, and loads the first virtual object based on the historical scene state in the target virtual scene. The historical scene state is used for indicating a state that a first virtual object of the target object is in at a historical moment, for example, a health value, a standing or squatting state, and a position in a virtual scene.

In some embodiments, the first server loads a virtual item in the historical scene state for the first virtual object in the target virtual scene, for example, a virtual gun, and a virtual vehicle.

In some embodiments, the first server loads a corresponding action state in the historical scene state for the first virtual object in the target virtual scene. The action state is, for example, the first virtual object is at a hilltop, the first virtual object is on a plain, or a heath value of the first object is not a maximum value.

For example, the target virtual scene is a training ground in an FPS game. The user intends to load a virtual item in advance in the training ground. For example, when the user often uses a virtual submachine gun and is used to using a 4× scope to train shooting at a medium or long distance from a target, in response to running the target virtual scene, the first server obtains virtual scene data corresponding to the scene progress with the scene progress as the running start point, that is, the virtual submachine gun, the 4× scope, the first virtual object being at a medium or long distance from the target, and the like, thereby implementing beforehand loading of virtual items, to allow the user to directly start training from the scene progress with the virtual items loaded.

In some embodiments, the loading request further carries matching information. The matching information is used for indicating a matching mode with a second virtual object in the target virtual scene. The second virtual object is any of the following: a virtual object belonging to the same camp as the first virtual object, a virtual object belonging to an adversarial camp of the first virtual object, and a neutral virtual object. The first virtual object is a virtual object corresponding to the target object. Correspondingly, the first server can further load the second virtual object in the target virtual scene based on the matching information.

For example, the target virtual scene is a multiplayer PVE scene. In addition to loading a virtual item for a user, the first server further needs to match an appropriate teammate for the user. The first server matches a teammate for the user according to matching information carried in the loading request, to implement better coordination between teammates, thereby improving the training effect or gaming experience, and improving user stickiness.

For example, the target virtual scene is a 1VS1 scene. In addition to loading a virtual item for a user, the first server further needs to match an appropriate teammate for the user. The first server matches an appropriate opponent for the user according to matching information carried in the loading request. Certainly, the user may invite an opponent. In this case, the matching information includes an account identifier of the opponent invited by the user.

For example, the target virtual scene is a multiplayer PVP scene. In addition to loading a virtual item for a user, the first server further needs to match an appropriate teammate and an appropriate opponent for the user. The first server matches an appropriate teammate and an appropriate opponent for the user according to matching information carried in the loading request. Certainly, the user may invite a teammate and an opponent. In this case, the matching information includes account identifiers of the teammate and the opponent invited by the user.

Step 506: The terminal displays the scene picture in response to receiving the scene picture.

In the embodiments of this application, for this step, reference may be made to step 203. Details are not described herein again.

In some embodiments, the scene picture is obtained through loading based on the scene progress and the historical scene state of the target object. Reference may be made to step 505. Details are not described herein again.

In some embodiments, the first virtual object is displayed in the scene picture, and the first virtual object is equipped with a virtual item corresponding to the historical scene state. Reference may be made to step 505. Details are not described herein again.

In some embodiments, the first virtual object is displayed in the scene picture, and the first virtual object is in an action state corresponding to the historical scene state. Reference may be made to step 505. Details are not described herein again.

In some embodiments, the second virtual object matched based on the matching information is displayed in the scene picture. Reference may be made to step 505. Details are not described herein again.

Figure 7:
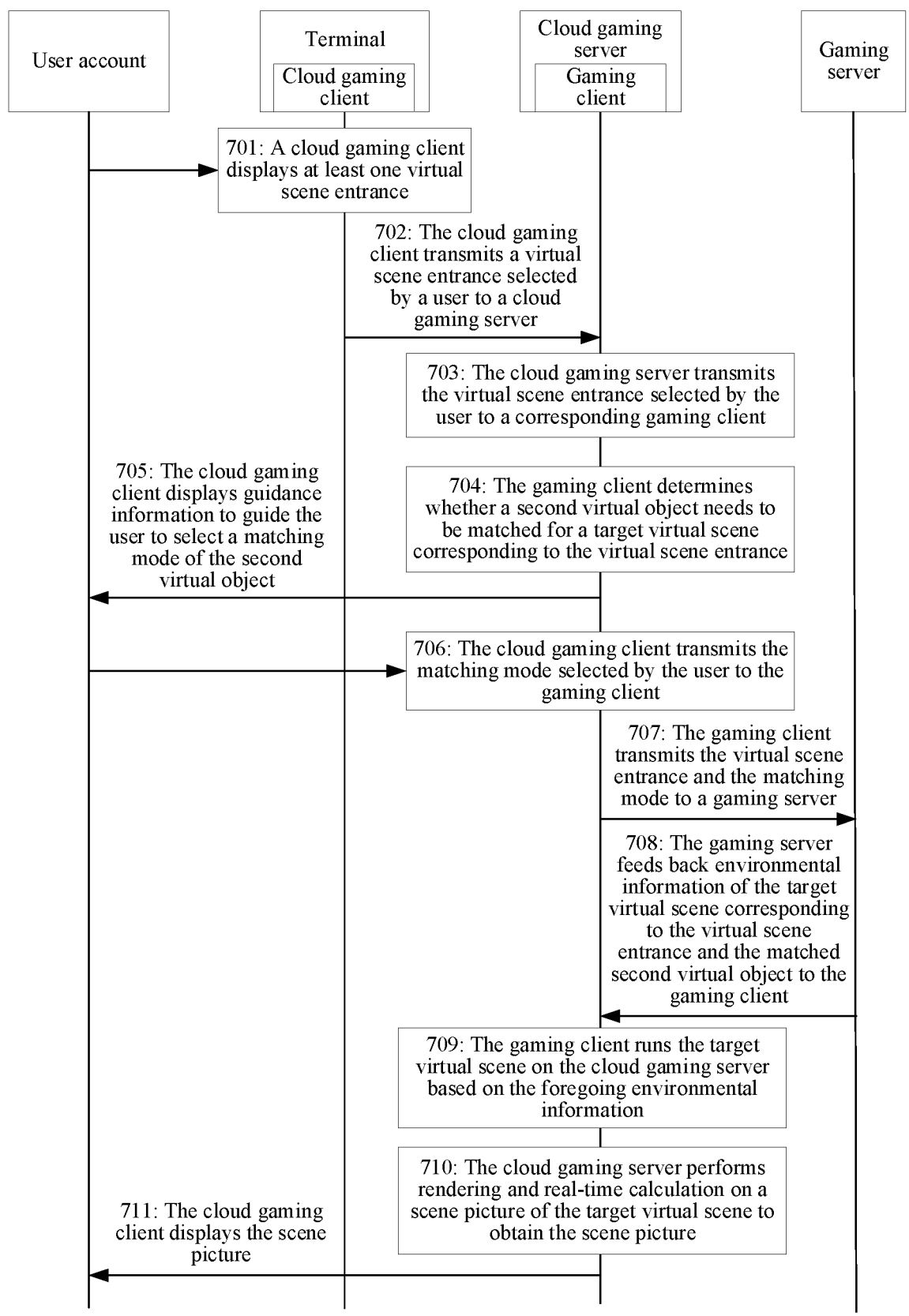
FIG. 7 is a schematic diagram of another interaction procedure according to an embodiment of this application.

To make the procedure described in the foregoing steps more comprehensible, an example in which a first client installed and run on a terminal is a cloud gaming client, a first server is a cloud gaming server, a second client is a gaming client, and a second server is a gaming server is used for description. FIG. 7 is a schematic diagram of another interaction procedure according to an embodiment of this application. As shown in FIG. 7, for example, the target object is a user account. The procedure includes the following steps: 701: A cloud gaming client displays at least one virtual scene entrance. 702: The cloud gaming client transmits a virtual scene entrance selected by a user to a cloud gaming server. 703: The cloud gaming server transmits the virtual scene entrance selected by the user to a corresponding gaming client. 704: The gaming client determines whether a second virtual object needs to be matched for a target virtual scene corresponding to the virtual scene entrance, and if yes, perform 705, or otherwise, perform 709. 705: The cloud gaming client displays guidance information to guide the user to select a matching mode of the second virtual object. The guidance information in this step is transparently transmitted through the cloud gaming client and the cloud gaming server. 706: The cloud gaming client transmits the matching mode selected by the user to the gaming client. The matching mode in this step is transparently transmitted through the cloud gaming client and the cloud gaming server. 707: The gaming client transmits the virtual scene entrance and the matching mode to a gaming server. 708: The gaming server feeds back environmental information of the target virtual scene corresponding to the virtual scene entrance and the matched second virtual object to the gaming client. 709: The gaming client runs the target virtual scene on the cloud gaming server based on the foregoing environmental information. 710: The cloud gaming server performs rendering and real-time calculation on a scene picture of the target virtual scene to obtain the scene picture. 711: The cloud gaming client displays the scene picture.

In the embodiments of this application, a virtual scene entrance is provided to a terminal, so that the user can view and trigger any virtual scene entrance according to preference. Because the virtual scene entrance corresponds to any scene progress of the target virtual scene, the current terminal can request the first server based on the scene progress corresponding to the virtual scene entrance to run the target virtual scene, so that the terminal may quickly display the scene picture of the corresponding virtual scene based on the virtual scene entrance selected by the user, and the user can reach the scene progress without complex operations, thereby significantly saving time and improving the efficiency of human-computer interaction and user stickiness.

Figure 8:
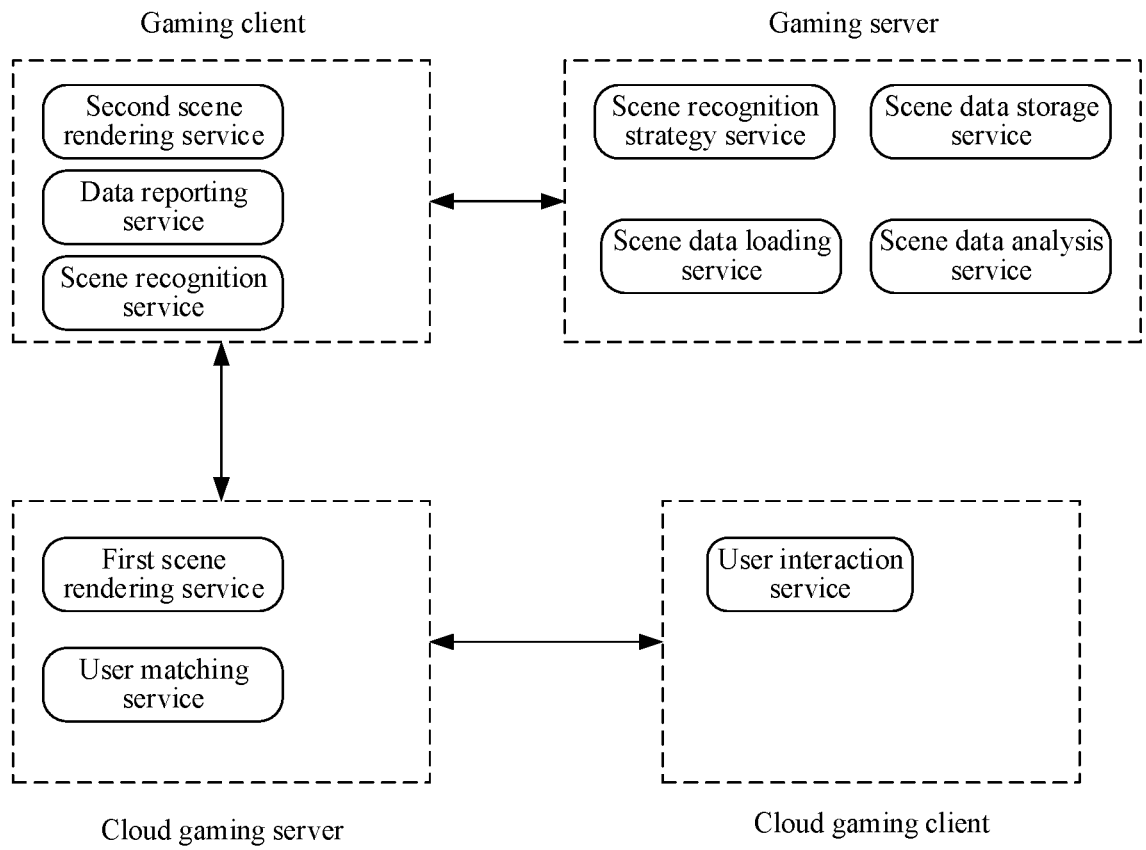
FIG. 8 is a diagram of a system architecture according to an embodiment of this application.

FIG. 8 is a diagram of a system architecture according to an embodiment of this application. As shown in FIG. 8, the system architecture includes a cloud gaming client, a cloud gaming server, a gaming client, and a gaming server. The cloud gaming client is a first client installed and run in the terminal. The cloud gaming server is a first server. The gaming client is a second client deployed in the cloud gaming server. The gaming server is a second server.

The cloud gaming client is configured to display at least one virtual scene entrance, the virtual scene entrance corresponding to any scene progress of a target virtual scene, the scene progress being determined based on historical interaction behavior of a target object in at least one virtual scene.

The cloud gaming client is further configured to transmit a loading request to the cloud gaming server in response to a trigger operation on a virtual scene entrance.

The cloud gaming server is configured to receive the loading request of the cloud gaming server, the loading request being used for instructing the first server to run the target virtual scene based on a scene progress corresponding to the virtual scene entrance, and returns a scene picture of the target virtual scene.

The cloud gaming server is further configured to: run the target virtual scene based on the scene progress, and transmit the scene picture of the target virtual scene to the cloud gaming client.

The gaming server is configured to provide a backend service to the gaming client.

The cloud gaming client displays the scene picture in response to receiving the scene picture.

The cloud gaming client includes a user interaction service. The user interaction service is used for the user to select a gaming mode, that is, whether to enter a conventional gaming mode or enter the mode designed in the solution, that is, directly enter a recommended game scene, for example, a game scene preferred by the user or a game scene shared by another user.

The cloud gaming server includes a first scene rendering service and a user matching service. The first scene rendering service is used for allowing the gaming client to deliver a loading request according to a virtual scene entrance selected by the user on the cloud gaming client, to load a corresponding virtual scene, and performs necessary rendering and real-time calculation for a virtual scene that cannot be directly loaded. The user matching service is used for assisting a player in inviting friends or performing automatic matching in a virtual scene involving player teaming or player battling.

The gaming client includes a second scene rendering service, a data reporting service, and a scene recognition service. The second scene rendering service is used for receiving related virtual scene data from the gaming server, and coordinates with the first rendering service of the cloud gaming server to load a corresponding virtual scene. The reporting service is used for reporting running information of a current virtual scene in a running process of a game, so that the user can experience the virtual scene from different scene progresses a next time. The scene recognition service is used for pulling a scene recognition strategy from the gaming server, and recognizing running information of a currently run virtual scene based on the scene recognition strategy.

The gaming server includes a scene recognition strategy service, a scene data storage service, a scene data loading service, and a scene data analysis service. The scene recognition strategy service is used for recognizing a strategy based on recognition strategies and classification strategies of various virtual scenes, and delivering the strategy to the gaming client to recognize a virtual scene. The scene data storage service is used for recording status data of the target object according to the running information reported by the gaming client, so that when entering the virtual scene again, the user may enter the virtual scene same as that when the user has left. The scene data loading service is used for receiving a request transmitted by the second scene rendering service, and delivering the status data of the target object to the gaming client, to render the virtual object corresponding to the target object in the virtual scene. The scene data analysis service is used for analyzing preference degrees of the target object for the virtual scenes according to various running information stored in the scene data storage service and in combination with interaction behavior of the target object in the virtual scenes, to recommend a virtual scene entrance for the target object.

Figure 9:
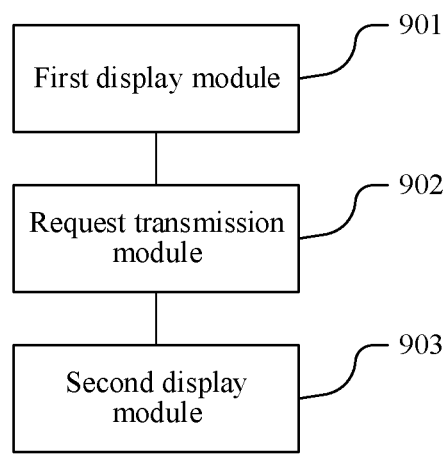
FIG. 9 is a block diagram of an apparatus for displaying a virtual scene according to an embodiment of this application.

FIG. 9 is a block diagram of an apparatus for displaying a virtual scene according to an embodiment of this application. The apparatus is configured to perform the steps in the foregoing method for displaying a virtual scene. Referring to FIG. 9, the apparatus includes a first display module 901, a request transmission module 902, and a second display module 903.

The first display module 901 is configured to display at least one virtual scene entrance, the virtual scene entrance corresponding to any scene progress of a target virtual scene, the scene progress being determined based on historical interaction behavior of a target object in at least one virtual scene.

The request transmission module 902 is configured to: transmit a loading request to a first server in response to a trigger operation on any virtual scene entrance in the at least one virtual scene entrance, the loading request being used for instructing the first server to run the target virtual scene based on a scene progress corresponding to the virtual scene entrance, and return a scene picture of the target virtual scene.

The second display module 903 is configured to display the scene picture in response to receiving the scene picture.

In some embodiments, the scene picture is obtained through loading based on the scene progress and a historical scene state of the target object, the historical scene state being used for indicating a state that a first virtual object of the target object is in at a historical moment.

In some embodiments, the first virtual object is displayed in the scene picture, and the first virtual object is equipped with a virtual item corresponding to the historical scene state.

In some embodiments, the first virtual object is displayed in the scene picture, and the first virtual object is in an action state corresponding to the historical scene state.

In some embodiments, the loading request further carries matching information, the matching information being used for indicating a matching mode with a second virtual object in the target virtual scene, the second virtual object being any of the following: a virtual object belonging to the same camp as the first virtual object, a virtual object belonging to an adversarial camp of the first virtual object, and a neutral virtual object.

Figure 10:
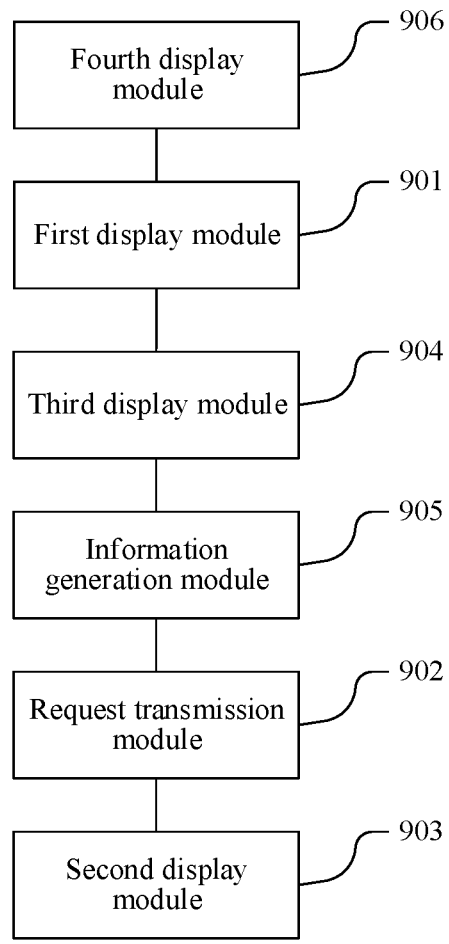
FIG. 10 is a block diagram of another apparatus for displaying a virtual scene according to an embodiment of this application.

FIG. 10 is a block diagram of another apparatus for displaying a virtual scene according to an embodiment of this application. The apparatus further includes:
 a third display module 904, configured to display a matching information setting page, the matching information setting page being used for setting a matching mode of the second virtual object; and
 an information generation module 905, configured to generate the matching information according to the matching mode set on the matching information setting page.

In some embodiments, the second virtual object matched based on the matching information is displayed in the scene picture.

In some embodiments, referring to FIG. 10, the apparatus further includes:
 a fourth display module 906, configured to display a scene picture of any virtual scene; and
 the fourth display module 906 being further configured to display guidance information of the virtual scene in the scene picture of the virtual scene, the guidance information being used for prompting whether to share a scene progress of the virtual scene.

In the solution provided in the embodiments of this application, at least one virtual scene entrance is displayed, so that the user can view and trigger any virtual scene entrance according to preference. Because the virtual scene entrance corresponds to any scene progress of the target virtual scene, the current terminal can request the first server based on the scene progress corresponding to the virtual scene entrance to run the target virtual scene, so that the terminal can display the scene picture of the target virtual scene at the scene progress, and the user can reach the scene progress without complex operations, thereby significantly saving time and improving the efficiency of human-computer interaction and user stickiness.

All the foregoing exemplary technical solutions may be combined in any way to form optional embodiments of the present disclosure. Details are not described herein again.

The apparatus for displaying a virtual scene provided in the foregoing embodiments displaying a virtual scene is illustrated with an example of division of the foregoing functional modules. In actual application, the functions may be allocated to and completed by different functional modules according to requirements, that is, the internal structure of the apparatus is divided into different functional modules, to implement all or some of the functions described above. In addition, the apparatus for displaying a virtual scene provided in the foregoing embodiment is based on a same concept as the embodiments of the method for displaying a virtual scene. For a specific implementation process, refer to the method embodiments, and details are not described herein again.

Figure 11:
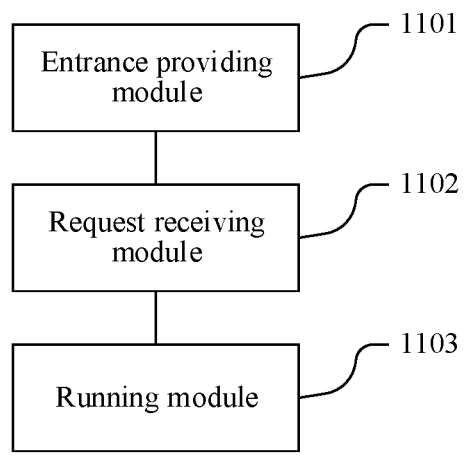
FIG. 11 is a block diagram of an apparatus for processing a virtual scene according to an embodiment of this application.

FIG. 11 is a block diagram of an apparatus for processing a virtual scene according to an embodiment of this application. The apparatus is configured to perform the steps in the foregoing method for processing a virtual scene. Referring to FIG. 11, the apparatus includes an entrance providing module 1101, a request receiving module 1102, and a running module 1103.

The entrance providing module 1101 is configured to provide at least one virtual scene entrance to a terminal, the virtual scene entrance corresponding to any scene progress of a target virtual scene, the scene progress being determined based on historical interaction behavior of a target object of the terminal in at least one virtual scene.

The request receiving module 1102 is configured to: receive a loading request of the terminal based on any virtual scene entrance in the at least one virtual scene entrance, the loading request being used for instructing to run the target virtual scene based on a scene progress of the virtual scene entrance, and return a scene picture of the target virtual scene.

The running module 1103 is configured to: run the target virtual scene based on the scene progress, and transmit the scene picture of the target virtual scene to the terminal.

In some embodiments, the running module 1103 is configured to: obtain virtual scene data corresponding to the scene progress with the scene progress as a running start point; and run the target virtual scene based on the virtual scene data.

Figure 12:
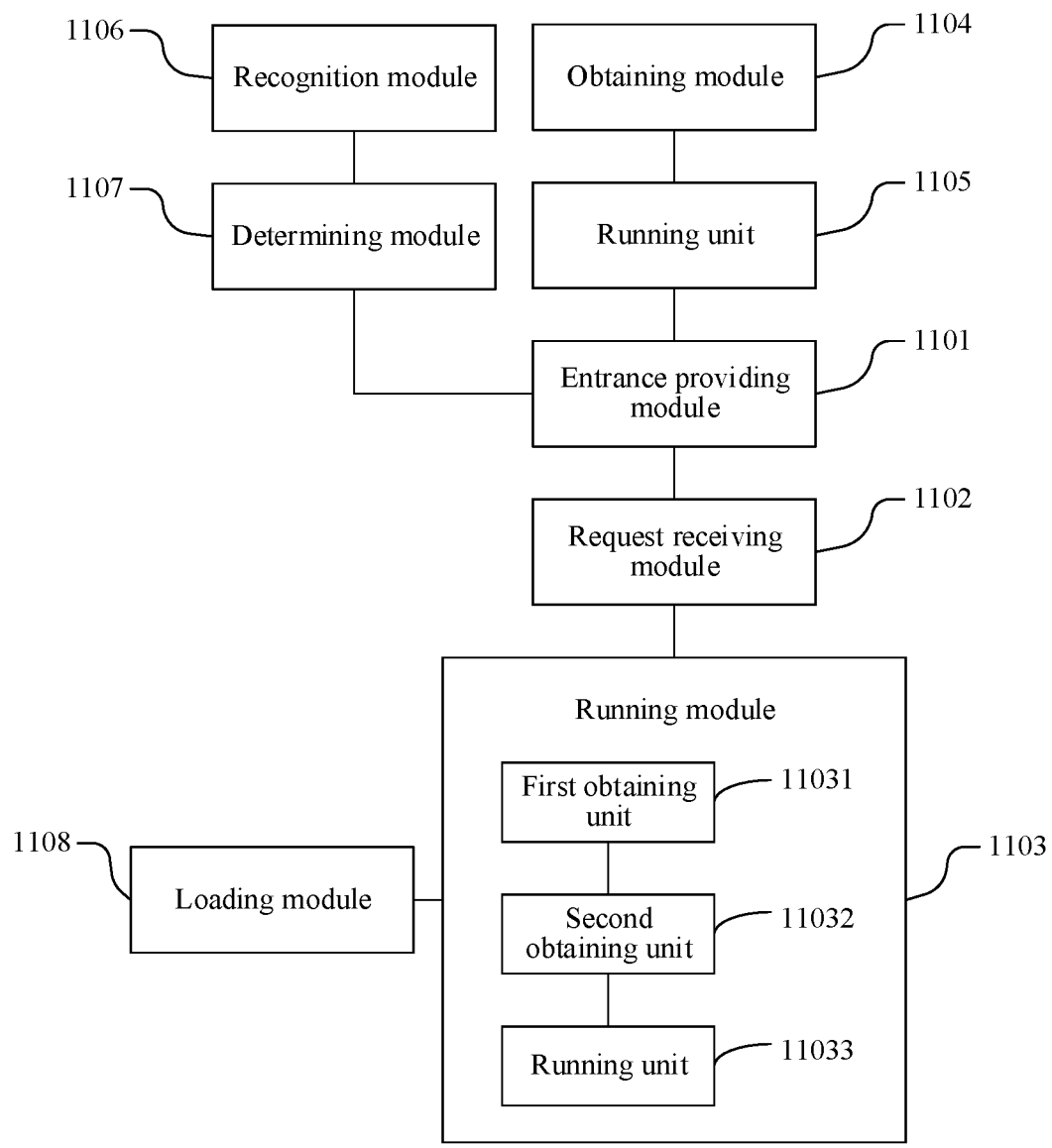
FIG. 12 is a block diagram of another apparatus for processing a virtual scene according to another embodiment of this application.

In some embodiments, FIG. 12 is a block diagram of another apparatus for processing a virtual scene according to an embodiment of this application. The running module 1103 includes:
 a first obtaining unit 11031, configured to obtain virtual scene data corresponding to the scene progress with the scene progress as a running start point; and
 a second obtaining unit 11032, configured to obtain a historical scene state of the target object, the historical scene state being used for indicating a state that a first virtual object of the target object is in at a historical moment; and
 a running unit 11033, configured to: run the target virtual scene based on the virtual scene data, and load the first virtual object based on the historical scene state in the target virtual scene.

In some embodiments, the running unit 11033 is configured to load a virtual item in the historical scene state for the first virtual object in the target virtual scene.

In some embodiments, the running unit 11033 is configured to load a corresponding action state in the historical scene state for the first virtual object in the target virtual scene.

In some embodiments, referring to FIG. 12, the apparatus further includes:

- an obtaining module 1104, configured to obtain historical interaction behavior of the target object in any virtual scene; and
- an entrance generation module 1105, configured to generate at least one virtual scene entrance of the target virtual scene based on at least one scene progress matching the historical interaction behavior in the target virtual scene.

In some embodiments, the at least one scene progress matching the historical interaction behavior is: at least one scene progress with an occurrence quantity of the historical interaction behavior satisfying a behavior condition.

In some embodiments, referring to FIG. 12, the apparatus further includes:

- a recognition module 1106, configured to recognize a scene type of a scene picture of any virtual scene of the terminal; and
- a determining module 1107, configured to determine the target virtual scene based on the scene type.

In some embodiments, the determining module 1107 is configured to: determine a target scene type based on an appearance quantity of the scene type, the target scene type being a scene type with an appearance quantity satisfying an appearance condition; and determine any virtual scene belonging to the target scene type as the target virtual scene.

In some embodiments, the loading request further carries matching information, the matching information being used for indicating a matching mode with a second virtual object in the target virtual scene, the second virtual object being any of the following: a virtual object belonging to the same camp as the first virtual object, a virtual object belonging to an adversarial camp of the first virtual object, and a neutral virtual object.

Referring to FIG. 12, the apparatus further includes:

- a loading module 1108, configured to load the second virtual object in the target virtual scene based on the matching information.

In the solution provided in the embodiments of this application, a virtual scene entrance is provided to the terminal, so that the first server can run a virtual scene based on a loading request transmitted by the terminal and return the scene picture, to allow the terminal to display the scene picture of the corresponding virtual scene based on a virtual scene entrance selected by the user. Because the scene picture is obtained through running based on the scene progress, the time required for the user to log in to the game, control the virtual object to head for an entrance of an instance, wait for the instance to be loaded, and push a progress of the instance to expected progress, thereby improving the efficiency of human-computer interaction.

All the foregoing exemplary technical solutions may be combined in any way to form optional embodiments of the present disclosure. Details are not described herein again.

The apparatus for processing a virtual scene provided in the foregoing embodiments processing a virtual scene is illustrated with an example of division of the foregoing functional modules. In actual application, the functions may be allocated to and completed by different functional modules according to requirements, that is, the internal structure of the apparatus is divided into different functional modules, to implement all or some of the functions described above.

In addition, the apparatus for processing a virtual scene provided in the foregoing embodiment is based on a same concept as the embodiments of the method for processing a virtual scene. For a specific implementation process, refer to the method embodiments, and details are not described herein again.

In the embodiments of this application, the computer device can be configured as a terminal or a server. When the computer device is configured as a terminal, the terminal may implement the technical solutions provided in the embodiments of this application. When the computer device is configured as a server, the server may implement the technical solutions provided in the embodiments of this application, or the terminal and the server may interact to implement the technical solutions provided in the embodiments of this application. This is not limited in the embodiments of this application.

Figure 13:
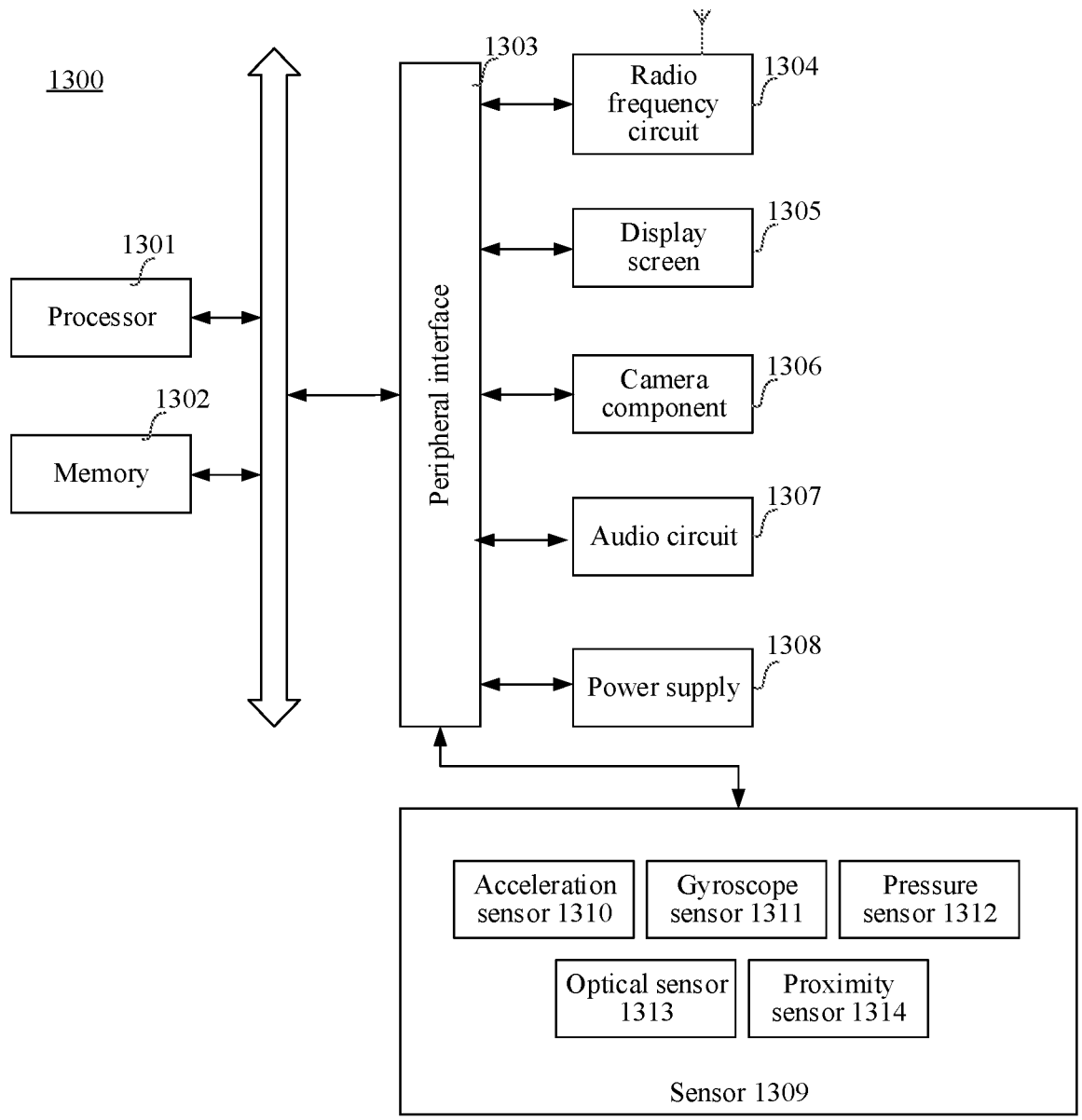
FIG. 13 is a structural block diagram of a terminal according to an embodiment of this application.

When the computer device is configured as a terminal, FIG. 13 is a structural block diagram of a terminal according to an embodiment of this application. The terminal 1300 may be a portable mobile terminal.

Generally, the terminal 1300 includes: a processor 1301 and a memory 1302.

The processor 1301 may include one or more processing cores, and may be, for example, a 4-core processor or an 8-core processor. The processor 1301 may be implemented in at least one hardware form of DSP, FPGA, and PLA. In some embodiments, the processor 1301 may be integrated with a graphics processing unit (GPU). The GPU is configured to render and draw content that needs to be displayed on a display.

The memory 1302 may include one or more computer-readable storage media that may be non-transitory. The memory 1302 may further include a high-speed random access memory (RAM) and a non-volatile memory, for example, one or more disk storage devices or flash storage devices. In some embodiments, the non-transient computer-readable storage medium in the memory 1302 is configured to store at least one computer program, and the at least one computer program is used for being executed by the processor 1301 to implement the method for displaying a virtual scene provided in the method embodiments of this application.

In some embodiments, the terminal 1300 may include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board. Specifically, the peripheral includes at least one of a radio frequency (RF) circuit 1304, a display screen 1305, a camera assembly 1306, an audio circuit 1307, and a power supply 1308.

The peripheral interface 1303 may be configured to connect the at least one peripheral related to input/output (I/O) to the processor 1301 and the memory 1302. In some embodiments, the processor 1301, the memory 1302, and the peripheral interface 1303 are integrated on the same chip or circuit board. In some other embodiments, any one or two of the processor 1301, the memory 1302, and the peripheral interface 1303 may be implemented on an independent chip or circuit board. This is not limited in this embodiment.

The RF circuit 1304 is configured to receive and transmit an RF signal that is also referred to as an electromagnetic signal. The RF circuit 1304 communicates with a communication network and other communication devices through the electromagnetic signal. The RF circuit 1304 converts an electrical signal into an electromagnetic signal for transmission, or converts a received electromagnetic signal into an electrical signal.

The display screen 1305 is configured to display a user interface (UI). The UI may include graphics, text, icons, videos, and any combination thereof. When the display screen 1305 is a touch display screen, the display screen 1305 is further capable of collecting touch signals on or above a surface of the display screen 1305. The touch signal may be inputted, as a control signal, to the processor 1301 for processing.

The camera component 1306 is configured to collect images or videos. Optionally, the camera 1306 includes a front-facing camera and a rear-facing camera.

The audio circuit 1307 may include a microphone and a speaker. The microphone is configured to collect sound waves of users and surroundings, and convert the sound waves into electrical signals and input the signals to the processor 1301 for processing, or input the signals to the RF circuit 1304 to implement voice communication.

The power supply 1308 is configured to supply power to components in the terminal 1300. The power supply 1308 may be an alternating-current power supply, a direct-current power supply, a disposable battery, or a rechargeable battery. When the power supply 1308 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the terminal 1300 further includes one or more sensors 1309. The one or more sensors 1309 include, but are not limited to, an acceleration sensor 1310, a gyroscope sensor 1311, a pressure 1312, an optical sensor 1313, and a proximity sensor 1315.

The acceleration sensor 1310 may detect a magnitude of acceleration on three coordinate axes of a coordinate system established by the terminal 1300. For example, the acceleration sensor 1310 may be configured to detect components of gravity acceleration on the three coordinate axes. The processor 1301 may control, according to a gravity acceleration signal collected by the acceleration sensor 1310, the touch display screen 1305 to display the UI in a landscape view or a portrait view. The acceleration sensor 1310 may be further configured to collect data of a game or a user movement.

The gyroscope sensor 1311 may detect a body direction and a rotation angle of the terminal 1300, and the gyroscope sensor 1311 may work with the acceleration sensor 1310 to collect a 3D action performed by the user on the terminal 1300. The processor 1301 may implement the following functions according to the data collected by the gyroscope sensor 1311: motion sensing (for example, changing the UI according to a tilt operation of the user), image stabilization during shooting, game control, and inertial navigation.

The pressure sensor 1312 may be disposed at a side frame of the terminal 1300 and/or a lower layer of the display screen 1305. When the pressure sensor 1312 is disposed at the side frame of the terminal 1300, a holding signal of the user on the terminal 1300 may be detected, and the processor 1301 performs left/right hand recognition or a quick operation according to the holding signal collected by the pressure sensor 1312.

The optical sensor 1313 is configured to collect ambient light intensity. In an embodiment, the processor 1301 may control display luminance of the display screen 1305 according to the ambient light intensity collected by the optical sensor 1313.

The proximity sensor 1315, also referred to as a distance sensor, is generally disposed on the front panel of the terminal 1300. The proximity sensor 1315 is configured to collect a distance between the user and the front surface of the terminal 1300.

A person skilled in the art may understand that the structure shown in FIG. 13 constitutes no limitation on the terminal 1300, and the terminal may include more or fewer components than those shown in the figure, or some components may be combined, or a different component deployment may be used.

Figure 14:
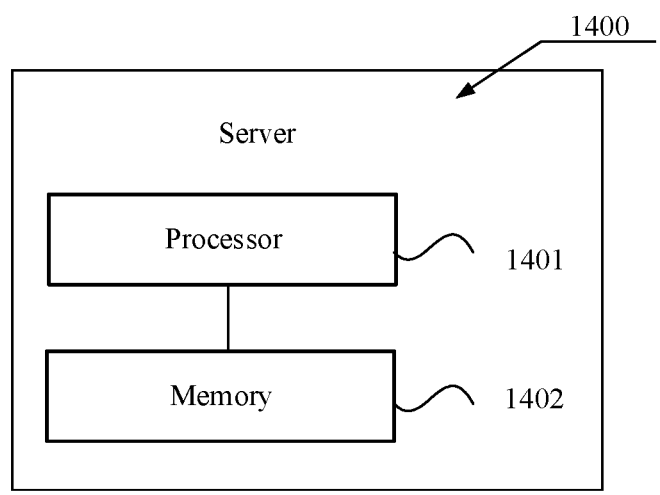
FIG. 14 is a structural block diagram of a server according to an embodiment of this application.

When the computer device is configured as a server, FIG. 14 is a structural block diagram of a server according to an embodiment of this application. The server 1400 may vary greatly due to different configurations or performance, and may include one or more processors (central processing units (CPUs)) 1401 and one or more memories 1402. The memory 1402 stores at least one computer program, the at least one computer program being loaded and executed by the processor 1401 to implement the method for processing a virtual scene provided in the foregoing method embodiments. Certainly, the server may further include components such as a wired or wireless network interface, a keyboard, and an input/output interface, to facilitate inputs/outputs. The server may further include another component configured to implement functions of a device. Details are not described herein again.

The embodiments of this application further provide a non-transitory computer-readable storage medium. The computer-readable storage medium stores at least one piece of computer program. The at least one piece of computer program is loaded and executed by a processor of a computer device to implement the operations performed by the computer device in the method for displaying a virtual scene in the embodiments of this application or implement the operations performed by the computer device in the method for processing a virtual scene in the embodiments of this application. For example, the computer readable storage medium may be a read-only memory (ROM), a random access memory (RAM), a compact disc read-only memory (CD-ROM), a tape, a floppy disk, an optical data storage device, or the like.

The embodiments of this application further provide a computer program product. The computer program product stores computer program code, the computer program code being stored in a computer-readable storage medium. A processor of a computer device reads the computer program code from the computer-readable storage medium, and executes the computer program code to cause the computer device to implement the method for displaying a virtual scene in the foregoing various optional implementations or cause the computer device to implement the method for processing a virtual scene in the foregoing various optional implementations.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a ROM, a magnetic disk or an optical disc.

The foregoing descriptions are embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs transmitting loading requests and/or displaying virtual scenes. In practical application, the foregoing functions may be allocated to and completed by different functional modules according to requirements, that is, an inner structure of a device is divided into different functional modules to implement all or a part of the functions described above.

What is claimed is:

1. A method for displaying a virtual scene, performed by a computer device, the method comprising:
   displaying at least one virtual scene entrance corresponding to at least one scene progress of a target virtual scene, wherein the at least one scene progress is determined based on historical behavior of a first virtual object in the target virtual scene, the first virtual object controlled by a user of the computer device, and the historical behavior of the first virtual object includes a position of the first virtual object in the target virtual scene that is determined from the user's previous sessions involving the target virtual scene;
   in response to receiving a trigger operation on a first virtual scene entrance in the at least one virtual scene entrance, transmitting a loading request to a first server system, distinct from the computer device;
   receiving, from the first server system, a scene picture of the target virtual scene, corresponding to the first virtual scene entrance; and
   displaying the scene picture on a display of the computer device in response to receiving the scene picture.

2. The method according to claim 1, wherein the loading request is used to instruct the first server system to run the target virtual scene based on a first scene progress corresponding to the first virtual scene entrance.

3. The method according to claim 1, wherein:
   the scene picture is obtained by loading based on the scene progress and a historical scene state of the first virtual object, the historical scene state indicating a state that the first virtual object is in at a historical moment.

4. The method according to claim 3, wherein the first virtual object is displayed in the scene picture, and the first virtual object is equipped with a virtual item corresponding to the historical scene state.

5. The method according to claim 3, wherein the first virtual object is displayed in the scene picture, and the first virtual object is in an action state corresponding to the historical scene state.

6. The method according to claim 1, wherein:
   the loading request further carries matching information indicating a matching mode with a second virtual object in the target virtual scene, wherein the second virtual object is different from the first virtual object; and
   the second virtual object is one of: a virtual object belonging to the same camp as the first virtual object, a virtual object belonging to an adversarial camp of the first virtual object, and a neutral virtual object.

7. The method according to claim 6, further comprising matching the second virtual object based on the matching information displayed in the scene picture.

8. The method of claim 1, further comprising prior to transmitting the loading request to the first server:
   displaying a matching information setting page, wherein the matching information setting page is used for setting a matching mode of a second virtual object different from the first virtual object; and
   generating the matching information according to the matching mode set on the matching information setting page.

9. The method according to claim 1, further comprising before displaying the at least one virtual scene entrance:
   displaying a scene picture of one or more virtual scenes; and
   displaying guidance information of the one or more virtual scenes in the scene picture of the target virtual scene, the guidance information being used for prompting whether to share a scene progress of the one or more virtual scenes.

10. A computer device, comprising:
    one or more processors; and
    memory storing one or more programs, the one or more programs comprising instructions that, when executed by the one or more processors, cause the one or more processors to perform operations comprising:
        displaying at least one virtual scene entrance corresponding to at least one scene progress of a target virtual scene, wherein the at least one scene progress is determined based on historical behavior of a first virtual object in the target virtual scene, the first virtual object controlled by a user of the computer device, and the historical behavior of the first virtual object includes a position of the first virtual object in the target virtual scene that is determined from the user's previous sessions involving the target virtual scene;
        in response to receiving a trigger operation on a first virtual scene entrance in the at least one virtual scene entrance, transmitting a loading request to a first server system, distinct from the computer device;
        receiving, from the first server system, a scene picture of the target virtual scene; and
        displaying the scene picture on a display of the computer device in response to receiving the scene picture.

11. The computer device according to claim 10, wherein the loading request is used to instruct the first server system to run the target virtual scene based on a first scene progress corresponding to the first virtual scene entrance.

12. The computer device according to claim 10, wherein:
the scene picture is obtained by loading based on the scene progress and a historical scene state of the first virtual object, the historical scene state indicating a state that the first virtual object is in at a historical moment.

13. The computer device according to claim 10, wherein:
the loading request further carries matching information indicating a matching mode with a second virtual object in the target virtual scene, wherein the second virtual object is different from the first virtual object; and
the second virtual object is one of: a virtual object belonging to the same camp as the first virtual object, a virtual object belonging to an adversarial camp of the first virtual object, and a neutral virtual object.

14. The computer device according to claim 13, the operations further comprising matching the second virtual object based on the matching information displayed in the scene picture.

15. The computer device according to claim 10, the operations further comprising prior to transmitting the loading request to the first server:
displaying a matching information setting page, wherein the matching information setting page is used for setting a matching mode of a second virtual object different from the first virtual object; and
generating the matching information according to the matching mode set on the matching information setting page.

16. The computer device according to claim 10, the operations further comprising before displaying the at least one virtual scene entrance:
displaying a scene picture of one or more virtual scenes; and
displaying guidance information of the one or more virtual scenes in the scene picture of the target virtual scene, the guidance information being used for prompting whether to share a scene progress of the one or more virtual scenes.

17. A non-transitory computer-readable storage medium, storing one or more instructions, the one or more instructions, when executed by one or more processors of a computer device, cause the one or more processors to perform operations comprising:
displaying at least one virtual scene entrance corresponding to at least one scene progress of a target virtual scene, wherein the at least one scene progress is determined based on historical behavior of a first virtual object in target virtual scene, the first virtual object controlled by a user of the computer device, and the historical behavior of the first virtual object includes a position of the first virtual object in the target virtual scene that is determined from the user's previous sessions involving the target virtual scene;
in response to receiving a trigger operation on a first virtual scene entrance in the at least one virtual scene entrance, transmitting a loading request to a first server system, distinct from the computer device;
receiving, from the first server system, a scene picture of the target virtual scene corresponding to the first virtual scene entrance; and
displaying the scene picture on a display of the computer device in response to receiving the scene picture.

18. The non-transitory computer-readable storage medium according to claim 17, wherein:
the scene picture is obtained by loading based on the scene progress and a historical scene state of the first virtual object, the historical scene state indicating a state that a first virtual object is in at a historical moment.

19. The non-transitory computer-readable storage medium according to claim 18, wherein the first virtual object is displayed in the scene picture, and the first virtual object is equipped with a virtual item corresponding to the historical scene state.

20. The non-transitory computer-readable storage medium according to claim 18, wherein the first virtual object is displayed in the scene picture, and the first virtual object is in an action state corresponding to the historical scene state.

* * * * *